United States Patent [19]

Camelio

[11] Patent Number: 4,738,488
[45] Date of Patent: Apr. 19, 1988

[54] ADJUSTABLE HEADREST

[76] Inventor: Carol L. Camelio, 69 Stanley Ave., Medford, Mass. 02155

[21] Appl. No.: 40,197

[22] Filed: Apr. 20, 1987

[51] Int. Cl.$^4$ ............................................. A47C 1/10
[52] U.S. Cl. ...................................... 297/393; 5/437; 5/436; 297/391
[58] Field of Search ...................... 297/393, 397, 391; 2/DIG. 6; 5/437, 434, 436

[56] References Cited

U.S. PATENT DOCUMENTS

| | | | |
|---|---|---|---|
| 1,510,187 | 9/1924 | Martin | 297/393 |
| 3,220,770 | 11/1965 | Schaeffer | 297/395 |
| 3,608,964 | 9/1971 | Earl | 297/397 |
| 4,042,278 | 8/1977 | Jensen | 297/397 |
| 4,206,945 | 6/1980 | Kifferstein | 297/220 |
| 4,274,673 | 6/1981 | Kifferstein | 297/220 |
| 4,383,713 | 5/1983 | Roston | 297/219 |
| 4,513,462 | 4/1985 | Thomas | 5/442 |
| 4,679,263 | 7/1987 | Honer | 5/437 |

FOREIGN PATENT DOCUMENTS 3418253 11/1985 Fed. Rep. of Germany ...... 297/397
838455 6/1960 United Kingdom ................ 297/393

OTHER PUBLICATIONS

Velcro Products News, Feb. 1977, PN No. 30, pp. 1 and 3.

Primary Examiner—James T. McCall
Attorney, Agent, or Firm—Lahive & Cockfield

[57] ABSTRACT

An adjustable headrest which can serve both as a headrest for fastening to the back of a chair or automobile seat or, in a folded over position as an adjustable neck and headrest. The headrest has an elongated tab with a fastner to hang the adjustable headrest from the back of a seat or, in the alternative use, to hold the headrest in a doubled over position to serve as an independent neck support and headrest.

3 Claims, 2 Drawing Sheets

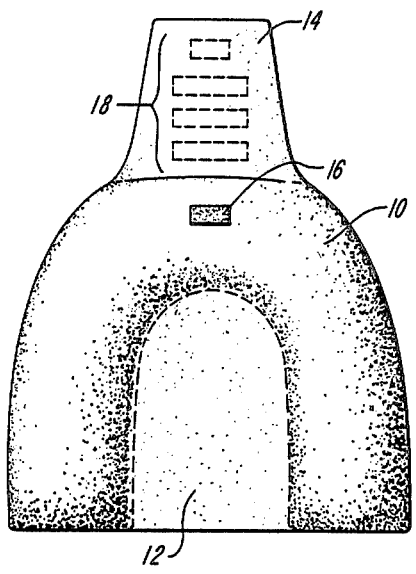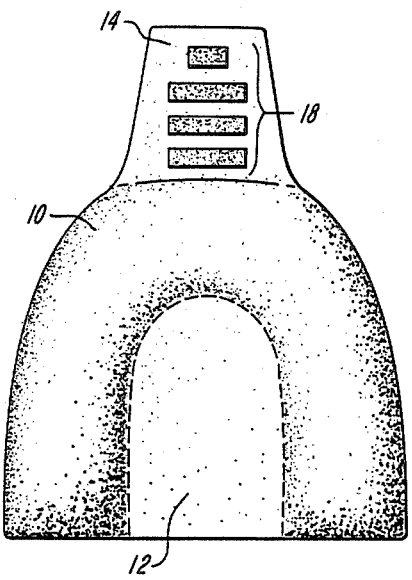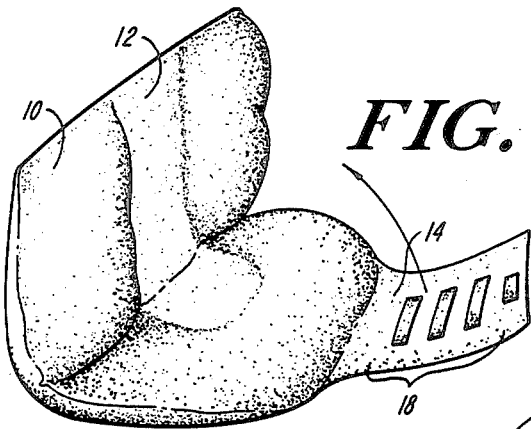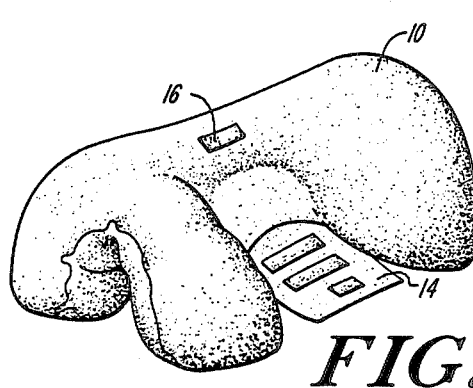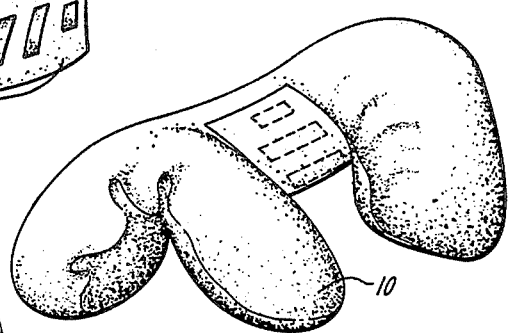
FIG. 1
FIG. 2
FIG. 3A
FIG. 3B
FIG. 3C

ADJUSTABLE HEADREST

FIELD OF THE INVENTION

The invention relates in general to headrests and more particularly to a padded headrest which can serve the dual functions of, being a headrest attached to the back of an automobile seat or chair or, in a folded over position, as a neck support and headrest.

BACKGROUND OF THE INVENTION

Cushions and other devices are known in the art for the purpose of providing additional head support. Such arrangements are shown in U.S. Pat. Nos. 4,042,278 issued Aug. 16, 1977; 4,274,673 issued June 23, 1981; 4,206,945 issued June 10, 1980; 3,608,964 issued Sept. 28, 1971; 3,220,770 issued Nov. 30, 1965; 4,513,462 issued Apr. 30, 1985 and 4,383,713 issued May 17, 1983.

SUMMARY OF THE INVENTION

Broadly speaking in the present invention a U shaped bolster or pillow is fastened to a flexible fabric panel with an elongated tab attached to the transverse section portion of the U shaped pillow. The elongated tab has a suitable fastener, such as velcro or snaps, to attach to the upper portion of the seat back. The bolster element itself is fitted with a corresponding velcro fastener on one surface of the transverse portion of the U shaped bolster and the strap is of sufficient length to permit it to wrap around the lower portion of the panel pulling the overall headrest into a doubled over configuration. The strap is now fastened to the fastener on the bolster thereby forming a separate neck support and headrest. In the headrest application, the fastener is fixed to the top of the back of the seat to serve as an anchoring point for the headrest, allowing it to remain relatively fixed against the back cushion. This situation is suitable for a headrest for long automobile trips for an adult, or a child, since the person's head may rest comfortably on it, providing sufficient support so that while dozing or sleeping, the person's head does not fall uncomfortably over on one side or the other. This advantage is provided by both the attached headrest application and the independent head and neck support application. It is particularly suitable in conjunction with a child's conventional car seat.

DESCRIPTION OF THE DRAWINGS

FIG. 1 is a perspective view from one side of the adjustable headrest of this invention;

FIG. 2 shows an illustration of the adjustable headrest of this invention in perspective view from the opposite side from that shown in FIG. 1;

FIG. 3a, 3b and 3c are illustrative of the folding over process to convert the adjustable headrest of FIG. 1 into an independent neck and headrest.

DESCRIPTION OF THE PREFERRED EMBODIMENT

Figure 4:
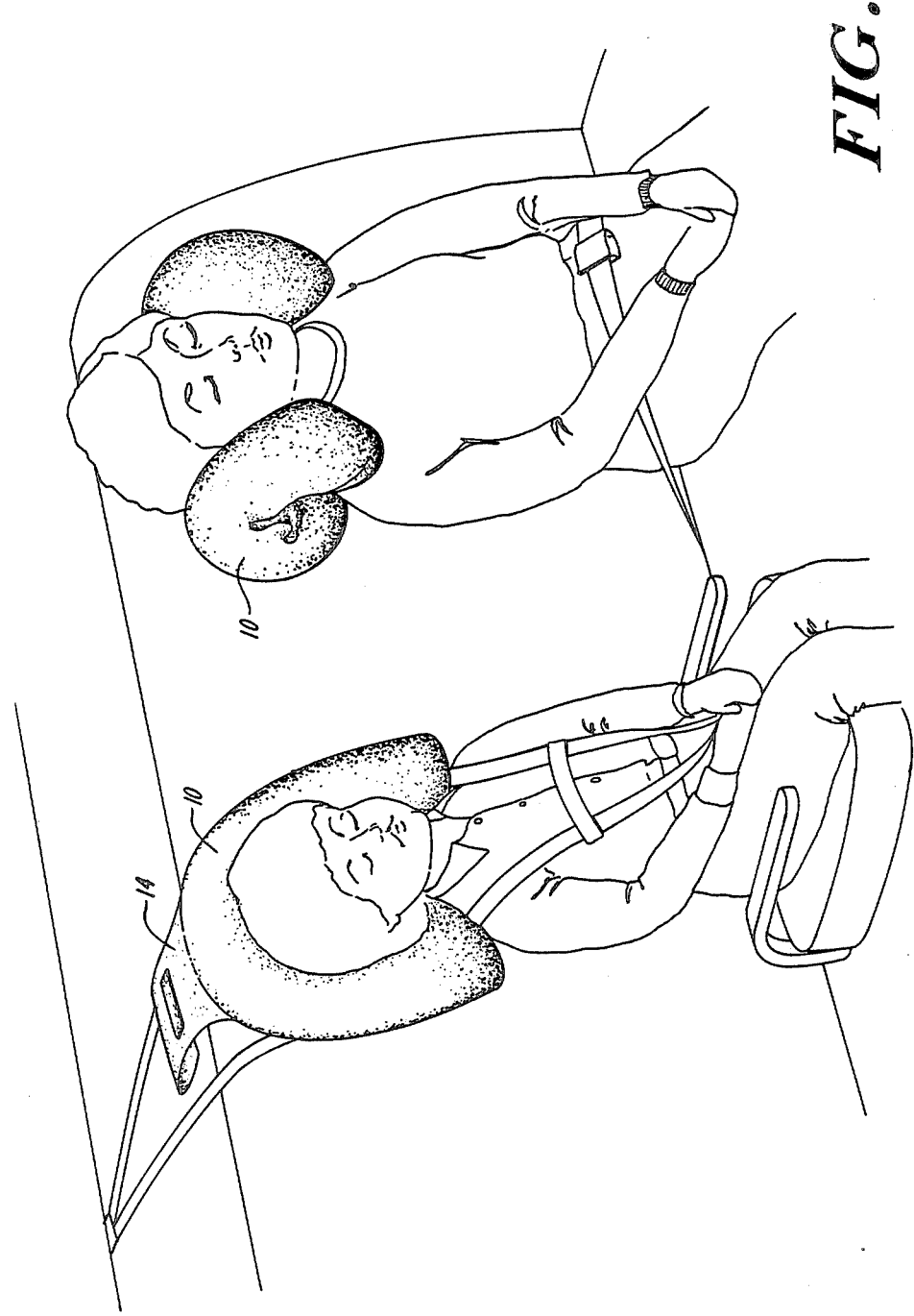
FIG. 4 is an illustration of the two uses of the headrest.

With reference now specifically to FIG. 1 a U shaped bolster or pillow element 10 is shown fastened to a flexible fabric panel 12 and has on the transverse section of the bolster or pillow 10 a Velcro strip 16. An elongated tab section 14 is fastened to the top of the transverse section of the pillow 10. As is illustrated more clearly in FIG. 2, a series of Velcro strips 18 is attached to the elongated tab 14 on the back side of that tab. Numerous materials may be suitable for use in this headrest. In one example, the pillow portion may have a cover of cotton, velour, or other soft durable (preferably washable) material, with an internal filling of soft fiber, such as polyester fiber, or foam material (preferably hypoallergenic). Similarly the panel material may be formed of any suitable soft, flexible generally planar material such as cotton or the like. The bolster or pillow section 10 may be stitched or otherwise fastened entirely onto the surface of the fabric panel 12 or, alternatively, the fabric panel 12 may be stitched at the midpoint of the thickness of the pillow 10.

The elongated tab section 14 can be a separate tab formed of any suitable fabric which may again be cotton or may be a webbing or other typical strap material. This elongated tab 14 may be stitched independently to the transverse portion of the U shaped pillow 10 or may be an extension of the panel 12 with the U shaped pillow attached to one surface of the panel.

Velcro fastener 16 may be attached in any suitable fashion to the pillow member 10. A series of Velcro strips 18 fastened to the tab permit adjustable height of the headrest with a fixed position of a tab fastened to the back of an automobile seat or chair back.

In FIGS. 3a, 3b, and 3c there is illustrated the process of doubling over the adjustable headrest with the elongated tab wrapping around and holding the headrest in position to serve as an independent neck support and headrest. Once again, the adjustable nature of the series of Velcro strips 18 on the elongated tab 14 permits for varying degrees of tightness in the doubled over neck rest.

While Velcro strips have been shown as one suitable fastener, it will be understood that any fastener, which generally operates with two portions, may be employed. Other suitable mechanical fasteners could include, for example, snaps.

In FIG. 4 the adjustable headrest is shown used both as a headrest attached to the seat back of an automobile with a child sitting in a conventional safety seat, and also as an independent neck support and headrest in the right hand view.

Having described the invention, various alternative forms will occur to those skilled in the art. The invention is described in the following claims.

I claim:

1. An adjustable headrest comprising a flexible fabric panel;

a U shaped pillow element attached to said flexible fabric panel;

an elongated flexible tab attached at one end to the transverse portion of said U shaped pillow and having a portion of a connector element attached to its other end;

a second portion of said connecting element being fastened to one surface of said transverse section of said U shaped pillow wherein said pillow is formed of sufficiently flexible material to enable the U shaped pillow to be doubled back on itself and wherein said elongated tab is sufficiently long to allow it to encircle the folded over portion of said adjustable headrest and fasten to that portion of the connector attached to said transverse section of the pillow.

2. An adjustable headrest in accordance with claim 1 wherein, said first connector portion fixed to the end of said elongated tab is a Velcro strip and wherein said connector portion fixed to said transverse section of said pillow is also a Velcro strip.

3. An adjustable headrest in accordance with claim 1 wherein, a series of fasteners is attached along the long axis of said tab to permit for adjustable fastening.

* * * * *